United States Patent [19]

Scherenberg

[11] Patent Number: 5,156,116
[45] Date of Patent: Oct. 20, 1992

[54] METHOD AND APPARATUS FOR CONTROLLING THE AIR SUPPLY IN AN INTERNAL COMBUSTION ENGINE

[75] Inventor: Dieter Scherenberg, Stuttgart, Fed. Rep. of Germany

[73] Assignee: Mercedes-Benz AG, Fed. Rep. of Germany

[21] Appl. No.: 807,589

[22] Filed: Dec. 16, 1991

[30] Foreign Application Priority Data

Dec. 14, 1990 [DE] Fed. Rep. of Germany ....... 4039992

[51] Int. Cl.⁵ ........................................... F02M 35/10
[52] U.S. Cl. .............................................. 123/52 MB
[58] Field of Search ......... 123/52 M, 52 MB, 52 MC, 123/52 MV

[56] References Cited

U.S. PATENT DOCUMENTS 4,838,215 6/1989 Yasuda et al. ................ 123/52 MV
5,063,899 11/1991 Hitomi et al. ................ 123/52 MV

FOREIGN PATENT DOCUMENTS 61-197713 9/1986 Japan .
61-229925 10/1986 Japan .

OTHER PUBLICATIONS

MTZ Motortechnische Zeitschrift 51 (Jan. 1990), pp. 142-146; Micik et al.

*Primary Examiner*—David A. Okonsky
*Attorney, Agent, or Firm*—Evenson, Wands, Edwards, Lenahan & McKeown

[57] ABSTRACT

A method and apparatus is described for controlling the air supply in an internal combustion engine, in which, below a predetermined limiting value for the speed of the internal combustion engine, the air is drawn in via at least two long resonant intake pipes, each of which opens into in each case one of two partial collecting volumes of a resonant collecting receiver, the volumes being separated from one another via a separating element. Above the predetermined limiting speed, the two partial collecting volumes are connected to one another by opening the separating element. In order to be able to achieve a higher torque characteristic not only in the low and middle speed range but also in the high speed range, it is proposed to open the cross-section of a short intake pipe which connects the intake line to the resonant collecting receiver, this opening being performed simultaneously with the opening of the separating element.

8 Claims, 4 Drawing Sheets

METHOD AND APPARATUS FOR CONTROLLING THE AIR SUPPLY IN AN INTERNAL COMBUSTION ENGINE

BACKGROUND AND SUMMARY OF THE INVENTION

The invention relates to a method and apparatus for controlling the air supply in an internal combustion engine comprising:

a resonant collecting receiver having two partial collecting volumes, at least two long resonant pipes via which air is drawn in below a predetermined limiting value for the speed of the internal combustion engine and each of which opens into in each case one of the two partial collecting volumes of the resonant collecting receiver, and a separating element movable between a closed position separating the partial collecting volumes from one another during engine speeds below a predetermined limiting speed and an open position connecting the partial collecting volumes during engine speeds below the predetermined limiting speed.

In an internal combustion engine known from "MTZ 51 (1990) 4, pages 142-146 (illustration 4)", provision is made for the air to be drawn in via two relatively long resonant intake pipes. These two resonant intake pipes are connected to a resonant collecting receiver which can be divided into two partial collecting volumes via a flap as required, one resonant intake pipe being connected to one partial collecting volume and the other resonant intake pipe being connected to the other partial collecting volume. Up to a predetermined limiting speed, this flap is closed, as a result of which, by exploiting resonant effects, it is possible to achieve an improved volumetric efficiency and thus an improvement in the torque characteristic in the lower and middle speed ranges. In the higher speed ranges, this flap is opened. Due to the relatively long resonant intake pipes, power losses are to be expected particularly in the higher speed range.

An object on which the invention is based is to provide a method and apparatus of the type described above with which a higher torque characteristic can be achieved not only in the low and middle speed range but also in the high speed range.

This object is achieved according to the invention by providing an arrangement wherein simultaneously with the opening of the separating element, a cross-section of a short intake pipe connecting an intake line to the resonant collecting receiver is opened and the two long resonant intake pipes are closed.

With the method and apparatus according to the invention, the air is drawn in via a very short intake pipe precisely from the instant at which the two partial collecting volumes in the resonant receiver are connected to one another, i.e., from the instant at which a resonance effect is no longer present. The frictional losses or flow losses during the intake of the fresh air are thus markedly reduced, resulting in an improved volumetric efficiency and accordingly a higher torque characteristic. The development according to certain preferred embodiments with simultaneous closing of the long resonance intake pipes with the opening of the separating element has the additional effect that air is drawn in exclusively via the short intake pipe, thus excluding mutual influencing of the flows passing into the resonant collecting receiver via the long resonant intake pipes and the flows passing into the resonant collecting receiver via the short intake pipe.

Other objects, advantages and novel features of the present invention will become apparent from the following detailed description of the invention when considered in conjunction with the accompanying drawings.

DETAILED DESCRIPTION OF THE DRAWINGS

Figure 1:
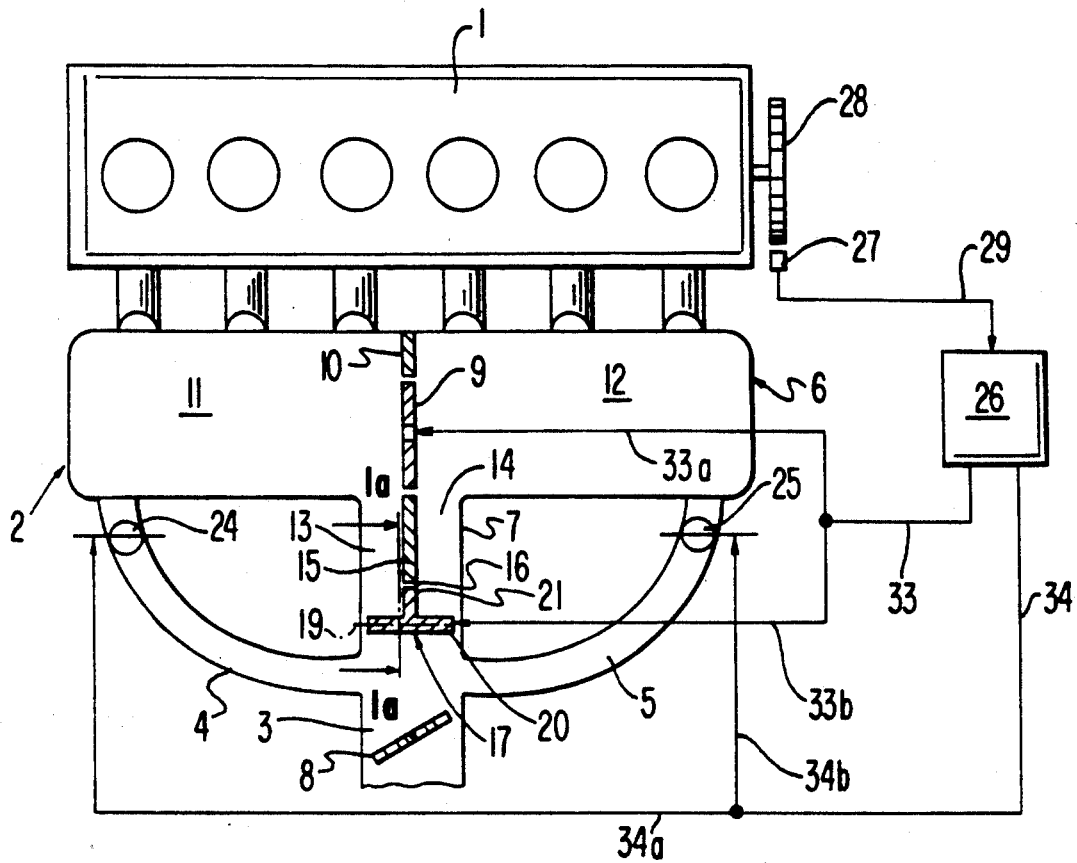
FIG. 1 is a schematic view which shows an illustrative embodiment of an apparatus for carrying out the method according to the invention.

FIG. 1 shows, in a plan view, a six-cylinder in-line internal combustion engine I of the reciprocating-piston type. Arranged on the inlet side of this internal combustion engine 1 is an intake system 2, the structure of which is as follows. Branching off from a common intake line 3 are two resonant intake pipes 4 and 5 which open into a resonant collecting receiver 6. The intake line 3 is furthermore connected to the resonant collecting receiver 6 via an intake pipe 7 which is relatively short and of relatively large cross-section in comparison with the two resonant intake pipes 4 and 5.

The load of the internal combustion engine is controlled via the butterfly valve 8 arranged in the intake line 3. The resonant collecting receiver 6 can be divided into two partial collecting volumes 11 and 12, as required, via a separating element designed as a flap 9 and arranged in a partition wall 10. Resonant intake pipe 4 is here connected to partial collecting volume 11 and resonant intake pipe 5 is connected to partial collecting volume 12.

The short intake pipe 7 connecting the intake line 3 to the resonant collecting receiver 6 has a partition wall 15 which divides it into two streams 13 and 14 and which lies in one plane with the flap 9 when the latter is closed. A valve element 17, which controls the two streams 13 and 14 or the cross-section of the short intake pipe 7 is furthermore arranged in the short intake pipe 7, as a prolongation of the partition wall 15 at its end 16 facing away from the flap 9. The valve element 17 is here designed as a flap 20 (see also FIG. 1a) which can be rotated about an axis 19 extending both perpendicularly to the plane of the partition wall 15 and perpendicularly to the longitudinal center line 18 of the intake pipe 7 and which is connected to a half disc 21, the semicircular outer contour 22 of which rests in a corresponding recess 23 at the end 16 of the partition wall 15.

In the position (shown in FIG. 1) of a closed valve element 17, complete separation of the two partial collecting volumes 11 and 12 is provided. Arranged in each of the two resonant intakes pipes 4 and 5 is a further flap 24 or 25. All the flaps 9, 24, 25 and the valve element 17 are activated via an electronic control unit 26 as a function of the speed n of the internal combustion engine. This is picked u at the flywheel 28 of the internal combustion engine 1 by means of the sensor 27 and passed to the electronic control unit 26 via the measured-value line 29.

Figure 2:
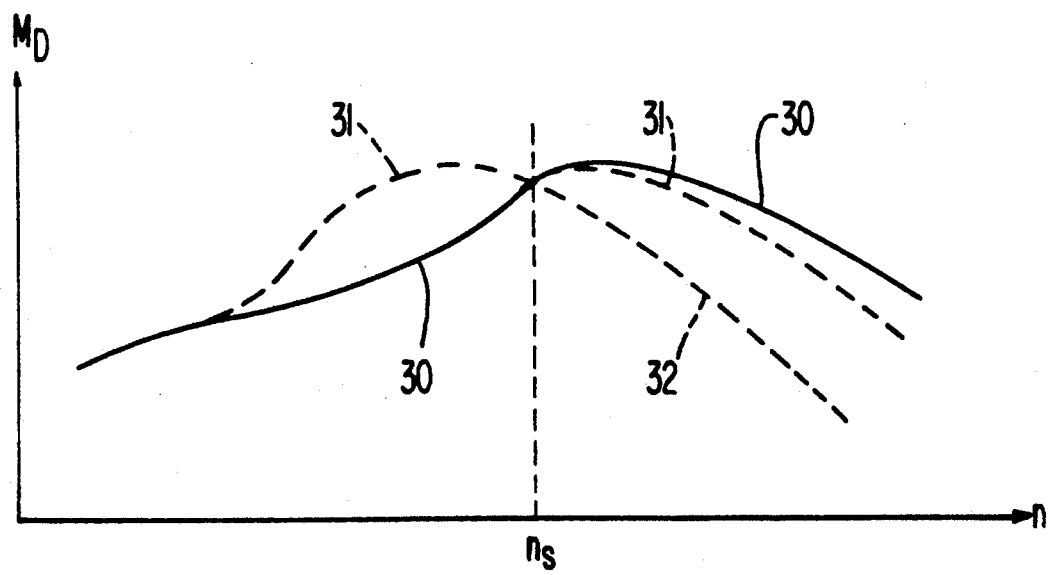
FIG. 2 shows, in a diagram $M_D=f(n)$, the relationship between the torque characteristic $M_D$ in a conventional internal combustion engine and that in an internal combustion engine operated by the method according to the invention.

The diagram $M_D = f(n)$ in FIG. 2 shows the relationship between the engine torque $M_D$ and the speed n in a conventional internal combustion engine, that is to say an internal combustion engine without tuned intake pressure charging (solid graph 30) and an internal combustion engine with tuned intake pressure charging (broken-lined graph 31). The solid curve 30 shows that, without tuned intake pressure charging, the torque level in the low and middle speed range is only relatively low. If tuned intake pressure charging is now provided in these speed ranges, that is to say if air is drawn in via relatively long resonant intake pipes and separate partial collecting volumes, then, as the shape of the broken-lined graph 31 shows, a clear increase in the torque level can here be achieved. In order to avoid an extreme drop in the torque characteristic in the higher speed range with tuned intake pressure charging (see thin broken line 32), provision is generally made in such methods to connect the two partial collecting volumes in the resonant receiver to one another from the limiting value $n_S$, (referred to below as switching speed $n_S$) for the speed n of the internal combustion engine at which the torque drop becomes apparent. Since, however, in previously known methods, air continues to be drawn in via long resonant intake pipes even above the switching speed $n_S$, only a relatively low torque level can be achieved in the higher speed range, in comparison to a conventional internal combustion engine (shape of the broken-lined graph 31 above the switching speed $n_S$).

In accordance with the method according to the invention, provision is now made for air to be drawn in exclusively via the two resonant intake pipes 4 and 5 (FIG. 1), with the separating flap 9 closed, up to the switching speed $n_S$. When this switching speed $n_S$ is exceeded, the separating flap 9 in the resonant collecting receiver 6 is opened and the cross-section of the short intake pipe 7 connecting the resonant collecting receiver 6 to the intake line 3 is simultaneously opened also. The fresh air can thus now be drawn in over the shortest route and thus the route which is associated with the lowest losses as regards friction, with the result that the high torque level of a conventional induction engine (FIG. 2: solid graph 30 above the switching speed $n_S$) can be achieved above this switching speed ns. The opening of the cross-section of the short intake pipe 7 is effected by rotating the valve element 17 through 90° in the direction of the arrow 88, after which it is in the position represented in broken lines in FIG. 1a, with the result that the fresh air can flow past unhindered to the right and to the left of the half disc 21. Starting from the closed position (represented in solid lines) shown in FIG. 1a, the flap can of course also be rotated through 90° counter to the direction of the arrow 88.

Provision is furthermore made for the two flaps 24 and 25 in the resonant intake pipes 4 and 5 to be closed above this switching speed $n_S$, mutual influencing of the flows passing into the resonant collecting receiver 6 via resonant intake pipes 4 and 5 thus being excluded. By means of this measure, an additional improvement in the volumetric efficiency and hence in the torque characteristic can be achieved. The flaps 9, 24 and 25 and the valve element 17 are activated from the control unit 26 (see FIG. 1), the individual flaps 9, 24 and 25 and the valve element 17 being actuated via suitable servo motors, not shown in the drawing for reasons of clarity, to which the control lines 33 and 34 are connected. Since, according to the invention, the separating flap 9 and the valve element 17, on the one hand, and the two flaps 24 and 25, on the other hand, are in each case to be actuated synchronously to one another, a common servo motor is sufficient for the flap 9 and the valve element 17, the said motor being activated via control line 33 and actuating both of the components 9 and 17 synchronously (arrows 33a and 33b) via a suitable actuating mechanism. The same likewise applies to the actuation of the two flaps 24 and 25, for which one servo motor likewise suffices, which, after activation via the control line 34, actuates both flaps 24 and 25 synchronously via a suitable actuating mechanism (arrows 34a and 34b).

Figure 1A:
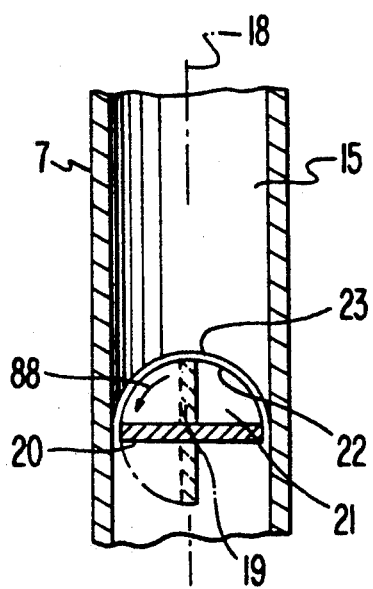
FIG. 1a shows a sectional representation of FIG. 1 along the line Ia—Ia.
Figure 1B:
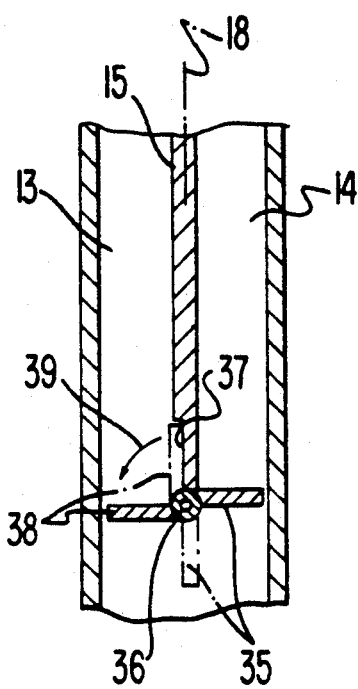
FIG. 1b is a view similar to FIG. 1a which shows a further advantageous solution for the control of the airflow passing through the intake pipe 7 in FIG. 1.

Instead of the possibility represented in FIG. 1a for controlling the air flow passing through the two streams 13 and 14, it is possible, as shown in FIG. 1b, to provide a conventional flap 35, which can be pivoted about an axis 36 extending both in the plane of the partition wall 15 and perpendicularly to the longitudinal center line 18 of the intake pipe 7. At its end facing away from the resonant collecting receiver 6, the partition wall 15 has a recess 37 which, in the open position of the flap 35, accommodates flap half 38 (broken-lined representation of the flap 35) of the flap 35 thus as it is shown lying in the plane of the partition wall 15. In this position, the partition wall 15 is extended by half the diameter of the flap 35. In order to close the intake pipe 7 or to separate the two streams 13 and 14 from one another, the flap 35 is pivoted through 90° in the direction of the arrow 39 (solid-lined representation of the flap 35).

Figure 1C:
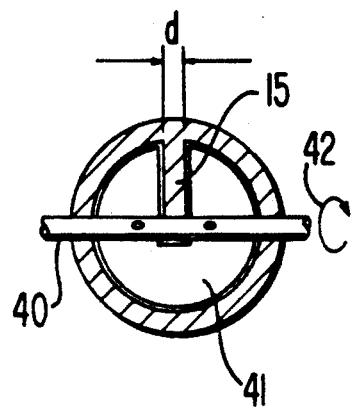
FIG. 1c is another Sectional view which shows a further advantageous solution of the control of the airflow passing through the intake pipe 7 in FIG. 1.

A further solution for the control of the air flow passing through the two streams is represented in FIG. 1c. Here, the two streams can be controlled by a slotted flap 41 mounted on a spindle 40 in a manner fixed in terms of rotation, the width of the slot being approximately equal to the thickness d of the partition wall 15. In the drawing, the flap 41 is in its closed position. In order to move into the open position, the flap 41 or the spindle 40 must be rotated through 90° in the direction of the arrow 42.

Instead of controlling the two streams via a slotted flap 41, it is also possible to control each of them via a separate flap, in which case these two flaps are of course to be actuated synchronously.

Figure 3:
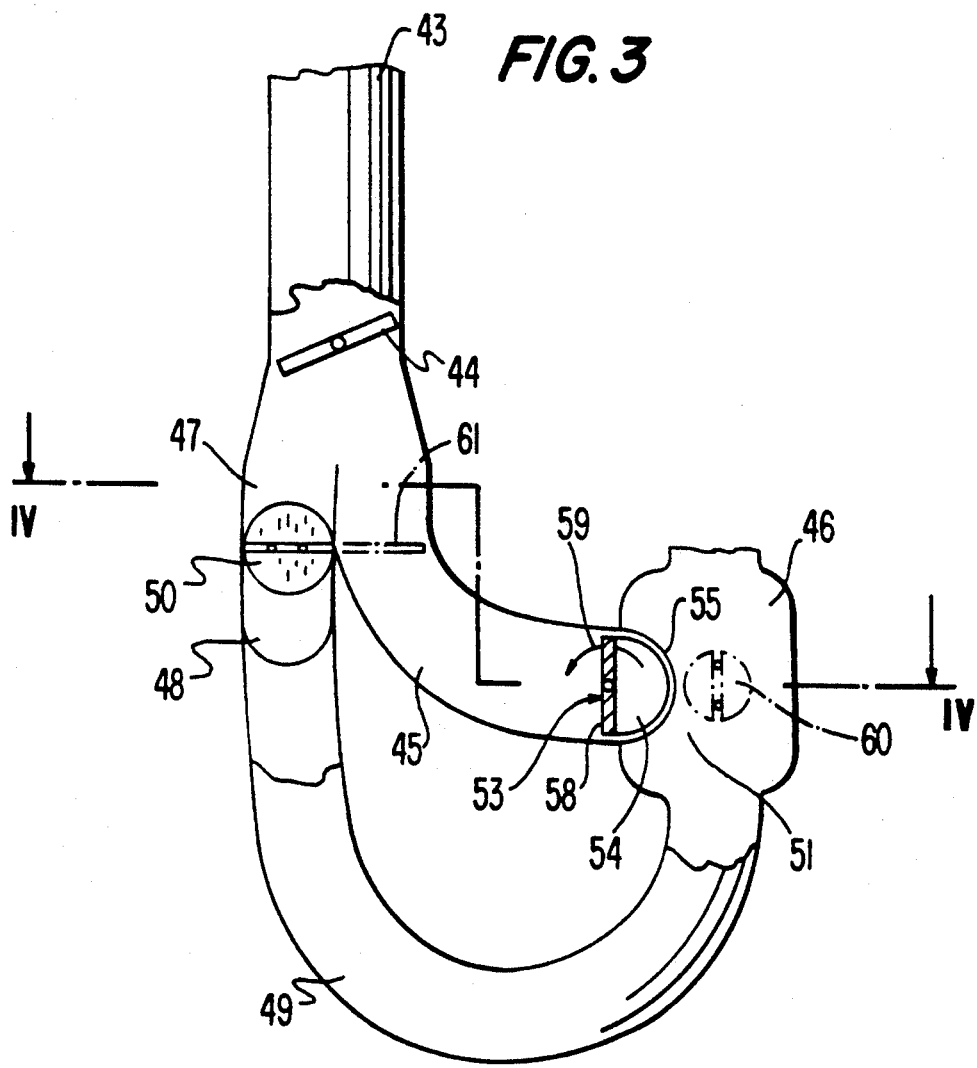
FIG. 3 is a schematic view which shows a further illustrative embodiment of an apparatus for carrying out the method according to the invention.
Figure 4:
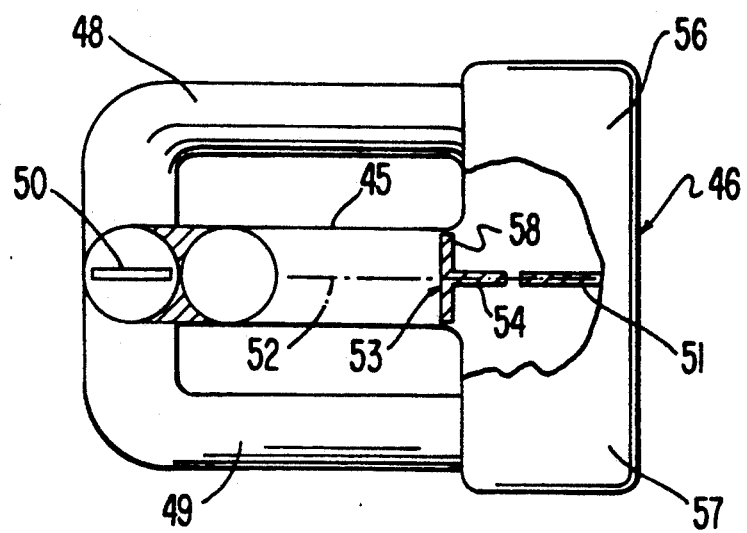
FIG. 4 shows a part sectional representation of FIG. 3 along the line IV—IV.

A further illustrative embodiment of an apparatus for carrying out the method according to the invention is shown by means of FIGS. 3 and 4. In this embodiment, the intake line 43, in which the butterfly valve 44 for controlling the load of the internal combustion engine is arranged, branches into a short intake pipe 45, which is connected to a resonant collecting receiver 46, and into a further line 47, which is turn branches into two long resonant intake pipes 48 and 49 which are likewise connected to the resonant collecting receiver 46. The cross-section of the intake pipe 45 is relatively large in comparison with that of one resonant intake pipe 48 or 49. Arranged in the further line 47, upstream of the branch into the two resonant intake pipes 48 and 49, is a flap 50 which controls the cross-section of this further line 47. In FIG. 4, which shows a sectional representation of FIG. 3 along the line IV—IV, it an be seen that the resonant collecting receiver 46 has a partition wall 51 which points in the direction of the longitudinal center line 52 of the intake pipe 45. In the region of the inlet of the intake pipe 45 into the resonant collecting receiver 46, a valve element 53 is provided, this valve element being of identical construction to the valve element 17 in the embodiment according to FIG. 1a, except that, in the closed position, the half disc 54 does not rest in a corresponding recess of a partition wall arranged in the intake pipe but in such a recess 55 in the partition wall 51 in the resonant collecting receiver 46 (see FIG. 3).

With the valve element 53 closed, the resonant collecting receiver 46 is thus divided into the two partial collecting volumes 56 and 57 and the intake pipe 45 is simultaneously closed (via the flap 58 of the valve element 53). If the valve element 53 is now rotated through 90° in the direction of the arrow 59, the two partial collecting volumes 56 and 57 are connected to one another and the cross-section of the intake pipe 45 opened simultaneously. A separate mechanism for the synchronous actuation of a flap and of a valve element, as provided in the illustrative embodiment according to FIG. 1, is no longer required here. The same applies to the control of the cross-sections of the two long resonant intake pipes 48 and 49, both of which are controlled, in this illustrative embodiment, via the flap 50 arranged in the further line 47. Resonant intake pipe 48 is connected to partial collecting volume 56 and resonant intake pipe 49 is connected to partial collecting volume 57 (FIG. 4). As in the first illustrative embodiment, flap 50 and valve element 53 are activated via an electronic control unit (not shown here) as a function of the speed n of the internal combustion engine.

According to the diagram of FIG. 2, the valve element 53 is in the closed position and the flap 50 in the open position up to the switching speed $n_S$. Air is thus drawn in exclusively via the two resonant intake pipes 48 and 49 and the two mutually separated partial collecting volumes 56 and 57. When this switching speed $n_S$ is exceeded, the valve element 53 is opened and the flap 50 closed, with the result that a connection between the two partial collecting volumes 56 and 57 is established and air is drawn in exclusively via the short intake pipe 45.

An alternative represented in broken lines in FIG. 3 is also contemplated, in which the separation of the two partial collecting volumes 56 and 57 is provided—as in FIG. 1—via a separate separating flap 60 instead of via the valve element 53 and the cross-section of the intake pipe is controlled via a second valve element 61, it being necessary for the valve element 61 to be designed in accordance with a solution according to FIG. 1a, 1b or 1c. Then too, synchronous actuation of these two flaps 60 and 61 would of course have to be effected again, i.e. up to the switching speed $n_S$, the two elements 60 and 61 would have to be closed and, from this switching speed $n_S$, that is to say when the flap 50 is closed, would have to be open. In an advantageous development, the valve element 61 in accordance with the solution in FIG. 1b, which controls the cross-section of the short intake pipe 45, and the flap 50 which controls the cross-sections of the two long resonant intake pipes could then, for example, be mounted on a shaft in a manner swivelled by 90° relative to one another and be actuated in common. In such a case, the recess 55 would of course no longer be present; instead, the partition wall would have to extend into the short intake pipe 45, as far as the valve element 61, in order to be able to exclude a connection of the two partial collecting volumes 56 and 57 below the switching speed $n_S$.

Figure 5:
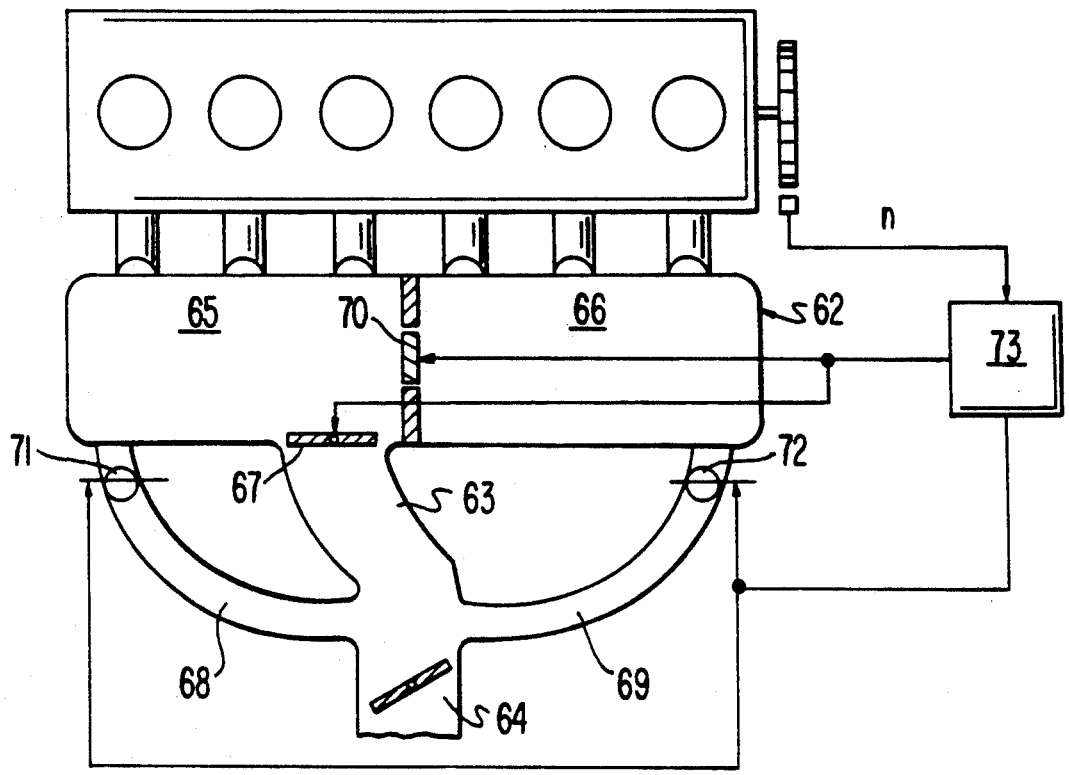
FIG. 5 is a schematic view which shows a further illustrative embodiment of an apparatus for carrying out the method according to the invention.

In another embodiment, which is shown in FIG. 5, provision is made for the short intake pipe 63 connecting the resonant collecting receiver 6 to the intake line 64 to be connected in the region of one partial collecting volume 65, with the result that it is no longer necessary to provide a separate partition wall in the intake pipe 63 in order to prevent a connection of the two partial collecting volumes 65 and 66. A simple flap 67 is sufficient, which is then closed precisely when air is drawn in exclusively via the two long resonant intake pipes 68 and 69, as is the flap 70 in the resonant collecting receiver 62. Finally, above the switching speed $n_S$, the two flaps 67 and 70 are opened synchronously and the two flaps 71 and 72 in the long resonant intake pipes 68 and 69 are closed synchronously, with the result that, once again, a connection is provided between the two partial collecting volumes 65 and 66 and air is drawn in exclusively via the short intake pipe 63. Here too, the flaps 67, 70, 71 and 72 are activated via an electronic control unit 73 as a function of the speed n of the internal combustion engine.

Figure 6:
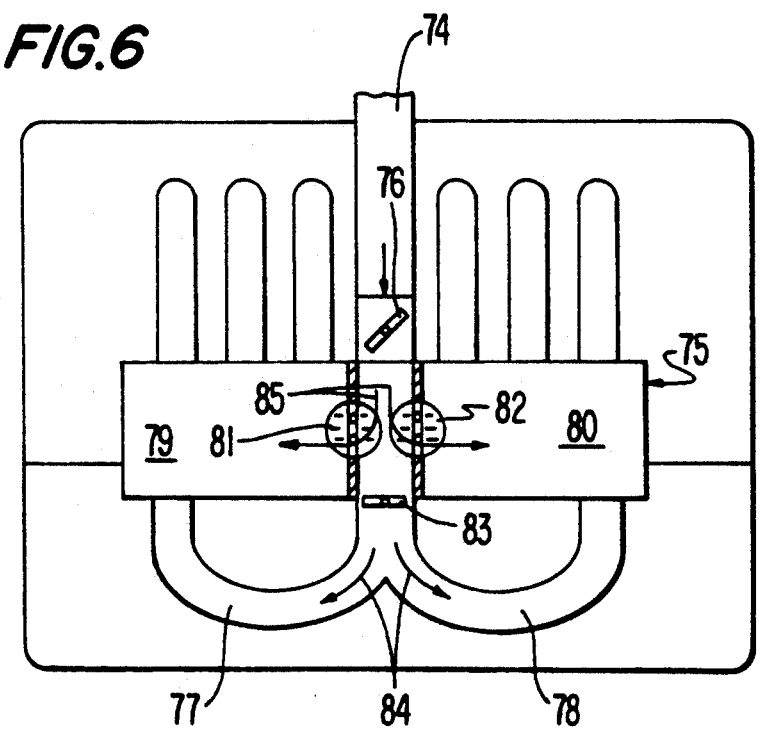
FIG. 6 is a schematic view which shows a further illustrative embodiment of an apparatus for carrying out the method according to the invention.

According to FIG. 6, provision is made to pass the intake line 74 through the resonant collecting receiver 75. Arranged in the intake line 74, upstream of the inlet into the resonant collecting receiver 75, is a butterfly valve 76 for controlling the load of the internal combustion engine. It is also possible to arrange the actuating drive for an electronic accelerator pedal at this point. After emerging from the resonant collecting receiver 75, the intake line 74 branches into two long resonant intake pipes 77 and 78 of relatively small cross-section. The intake line 74 divides the resonant collecting receiver 75 into two partial collecting volumes 79 and 80. In the region in which the intake line 74 passes through he resonant collecting receiver 75, its wall is provided with two flaps 81 and 82. If these are in the open position, a direct connection to the resonant collecting receiver 75 and a direct connection of the two partial collecting volumes 79 and 80 to one another is established. In the closed position, on the other hand, he two partial collecting volumes 79 and 80 are separated from one another. Resonant intake pipe 77 is connected to partial collecting volume 79 and resonant intake pipe 78 is connected to partial collecting volume 80. Downstream of the two flaps 81 and 82 arranged in the wall of the intake line 74, the cross-section of the intake line 74 and thus the cross-sections of the two resonant intake pipes 77 and 78 can be controlled via a further flap 83. According to the invention, provision is made for the two flaps 81 and 82 to be closed and the flap 83 to be open up to the switching speed $n_S$. The air is thus drawn in exclusively via the two long resonant intake pipes 77 and 78 (arrows 84). When the switching speed $n_S$ is exceeded the two flaps 81 and 82 in the wall of the intake line 74 are opened and the flap 83 is closed simultaneously (flap position in FIG. 6). In this operating range, the air is thus drawn in over a short and thus low-loss route directly via the resonant collecting receiver 75 (arrows 85), the two partial collecting volumes 79 and 80 of which are now also connected to one another.

For a preferred first embodiment according to FIGS. 1, 1a, 1b, and 1c, the engine switching speed $n_S$ is in the range of approximately 3,250 revolutions per minute; the length of the two long resonant pipes 4 and 5 is at least 270 millimeters, their diameters are at least 55 millimeters; and the length of the short intake pipe 7 is at most 120 millimeters.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Intake system for an internal combustion engine comprising:
   a resonant collecting receiver having two partial collecting volumes,
   at least two long resonant pipes via which air is drawn in below a predetermined limiting value for the speed of the internal combustion engine and each of which opens into in each case one of the two partial collecting volumes of the resonant collecting receiver, and
   a separating element movable between a closed position separating the partial collecting volumes from one another during engine speeds below a predetermined limiting speed and an open position connecting the partial collecting volumes during engine speeds below the predetermined limited speed, wherein, simultaneously with the opening of the separating element, a cross-section of a short intake pipe connecting an intake line to the resonant collecting receiver is opened and the two long resonant intake pipes are closed.

2. Intake system according to claim 1, wherein the separating element is designed as a flap, wherein a partition wall is provided in the intake pipe which divides the intake pipe into two streams and lies in one plane with the closed separating flap, and wherein a valve element providing equal control for both streams is arranged at an end of the partition wall which faces away from the resonant collecting receiver.

3. Intake system according to claim 2, wherein the valve element is designed as a flap which can be rotated about an axis extending both perpendicularly to the plane of the partition wall and perpendicularly to a longitudinal center line of the intake pipe and which is connected to a half disc which lies essentially in one plane with the partition wall, the semi-circular outer contour of which disc rests against a corresponding recess at the end of the partition wall.

4. Intake system according to claim 2, wherein the valve element controlling the two streams is a flap which is mounted in such a way as to be rotatable about an axis extending in the plane of the partition wall and perpendicularly to the longitudinal center line of the intake pipe and provided at that end of the partition wall which faces away from the resonant collecting receiver and, in the closed position, closes the intake pipe and separates the two streams and, in the open position, lies in the plane of the partition wall.

5. Intake system according to claim 1, the intake pipe is connected to one of the two partial collecting volumes, and wherein the cross-section of the intake pipe is controllable by means of a flap.

6. Intake system according to claim I, wherein the separating element and the valve element which controls the cross-section of the intake pipe form one constructional unit.

7. Intake system according claim 7, in wherein a partition wall which separates the two partial collecting volumes from one another and extends in the direction of the longitudinal center line of the intake pipe is arranged in the resonant collecting receiver, and wherein a flap is provided in the region of the inlet of the intake pipe into the resonant collecting receiver which can be rotated about an axis extending both perpendicularly to the plane of the partition wall and perpendicularly to the longitudinal center line of the intake pipe and is connected to a half disc which lies essentially in one plane with the partition wall and the semi-circular outer contour of which rests against a corresponding recess at the end of the partition wall.

8. Intake system according to claim 1, wherein the intake line is passed through a resonant collecting receiver divided by it into two partial collecting volumes, wherein two flaps are arranged in the wall of the intake line, which, when the two flaps are moved into their open position, establish a connection of the two partial collecting volumes to one another, wherein the cross-section of the intake line can be controlled downstream of these two flaps by a further flap, and wherein the intake line branches into two long resonant pipes, downstream of the further flap, one of which long resonant pipes is connected to one partial collecting volume and the other of which is connected to the other partial collecting volume.

* * * * *